United States Patent
Piersol et al.

US008265652B2

(10) Patent No.: US 8,265,652 B2
(45) Date of Patent: *Sep. 11, 2012

(54) GEOGRAPHIC TAGGING OF NETWORK ACCESS POINTS

(75) Inventors: Kurt W. Piersol, Campbell, CA (US);
John W. Barrus, Menlo Park, CA (US);
Stephen R. Savitzky, San Jose, CA (US)

(73) Assignee: Ricoh Co., Ltd., Tokyo (JP)

( * ) Notice: Subject to any disclaimer, the term of this patent is extended or adjusted under 35 U.S.C. 154(b) by 918 days.

This patent is subject to a terminal disclaimer.

(21) Appl. No.: 12/132,508

(22) Filed: Jun. 3, 2008

(65) Prior Publication Data

US 2009/0088182 A1   Apr. 2, 2009

Related U.S. Application Data

(60) Provisional application No. 60/977,055, filed on Oct. 2, 2007, provisional application No. 60/979,659, filed on Oct. 12, 2007.

(51) Int. Cl.
H04W 24/00   (2009.01)
(52) U.S. Cl. ............... 455/456.1; 455/404.2; 455/456.5
(58) Field of Classification Search ............... 455/456.1, 455/456.2, 456.3, 456.4, 456.5, 456.6, 414.2, 455/404.2, 440, 457
See application file for complete search history.

(56) References Cited

U.S. PATENT DOCUMENTS

| 5,121,126 | A | 6/1992 | Clagett |
| 7,095,319 | B2 | 8/2006 | Izumi et al. |
| 7,149,499 | B1 | 12/2006 | Oran et al. |

(Continued)

FOREIGN PATENT DOCUMENTS

EP   1298847 A1   4/2003
(Continued)

OTHER PUBLICATIONS

"Ekahau—Home," Ekahau, Inc., 2000-2008, [online] [Retrieved on Oct. 15, 2008] Retrieved from the Internet<URL:http://www.ekahau.com/>.

(Continued)

*Primary Examiner* — Anthony Addy
*Assistant Examiner* — Khalid Shaheed
(74) *Attorney, Agent, or Firm* — Patent Law Works LLP

(57) ABSTRACT

A system for geographic tagging of network access points comprises a plurality of access points that have been configured to provide location information as part of their beacon. Each access point provides a service set identifier (SSID) that includes an encoded value that represents the location of the access point. The use of an encoded location value in the SSID of the access point is particularly advantageous because it does not require any additional hardware be added to the access point or the portable computing device. Moreover, location can be determined by any portable device without establishing a connection to the access point. The portable computing devices are adapted to receive the beacon, extract the location information from the beacon and decode the beacon. The present invention also includes a variety of methods including: a method for geographic tagging of network access points, a method for encoding a location into a geographic code, a method for decoding a geographic code into a location, a method for encoding height into a geographic code, a method for decoding height from a geographic code and a method for determining the location using a plurality of geographic codes.

29 Claims, 9 Drawing Sheets

U.S. PATENT DOCUMENTS

| | | | |
|---|---|---|---|
| 7,289,931 B2 * | 10/2007 | Ebert | 702/150 |
| 7,903,005 B2 * | 3/2011 | Ueda | 341/83 |
| 2004/0051664 A1 | 3/2004 | Frank | |
| 2005/0147073 A1 * | 7/2005 | Hietalahti et al. | 370/338 |
| 2007/0055746 A1 * | 3/2007 | Oran et al. | 709/217 |
| 2007/0121557 A1 * | 5/2007 | Sylvain | 370/338 |
| 2008/0162519 A1 * | 7/2008 | Hsieh | 707/101 |
| 2008/0280624 A1 * | 11/2008 | Wrappe | 455/456.1 |
| 2009/0115661 A1 | 5/2009 | Torimoto et al. | |

FOREIGN PATENT DOCUMENTS

| | | |
|---|---|---|
| WO | WO 01/63956 A1 | 8/2001 |
| WO | WO 2004/077753 A2 | 9/2004 |
| WO | WO 2005/106523 A1 | 11/2005 |
| WO | WO 2007/146406 A2 | 12/2007 |

OTHER PUBLICATIONS

"Eye-Fi >> Overview," Eye-Fi, [online] [Retrieved on Oct. 15, 2008] Retrieved from the Internet<URL:http://www.eye.fi/overview/>.

"Loki—You Can Get There From Here," Skyhook Wireless, Inc., 2006-2008, [online] [Retrieved on Oct. 15, 2008] Retrieved from the Internet<URL:http://loki.com>.

"Home," Novatel Wireless, Inc., 2008, [online] [Retrieved on Oct. 15, 2008] Retrieved from the Internet<URL:http://www.novatelwireless.com/>.

"Skyhook Wireless: > Home," Skyhook Wireless, Inc., 2008, [online] [Retrieved on Oct. 15, 2008] Retrieved from the Internet<URL:http://www.skyhookwireless.com/>.

"Skype Phone—Skype Headset—Skype Web Cam—Skype WiFI Phone—Accessories," Skype Limited, [online] [Retrieved on Oct. 15, 2008] Retrieved from the Internet<URL:http://us.accessories.skype.com/servlet/ControllerServlet?Action=DisplayHomePage&Sit...>.

European Search Report, European Application No. 08165406.3, Feb. 6, 2009, 9 pages.

United States Office Action, U.S. Appl. No. 12/132,507, May 17, 2011, 8 pages.

United States Notice of Allowance, U.S. Appl. No. 12/132,507, Aug. 23, 2011, 6 pages.

United States Office Action, U.S. Appl. No. 12/240,639, Nov. 10, 2011, 15 pages.

* cited by examiner

GEOGRAPHIC TAGGING OF NETWORK ACCESS POINTS

CROSS REFERENCE TO RELATED APPLICATIONS

This application claims priority under 35 U.S.C. §119(e) from U.S. Provisional Patent Application No. 60/977,055, titled "Geographic Tagging of Network Access Points," filed Oct. 2, 2007, and from U.S. Provisional Patent Application No. 60/979,659, titled "Applications And Users Of GeoFi System" filed Oct. 12, 2007, both of which are incorporated by reference herein in their entirety.

BACKGROUND OF THE INVENTION

1. Field of the Invention

The present invention relates to the field of geographic location systems in general, and specifically, to the use of network access points to provide geographic information.

2. Description of the Background Art

With the proliferation of portable computing devices such as laptop computers and personal digital assistants, and mobile communications devices such as smart phones and cellular telephones, it is advantageous for a user to be able to know their precise location. Knowing one is precise location along with the computational capabilities of such computing devices allows users to access information that can greatly simplify any number of tasks. For example, retrieving directions to an off-site meeting requires knowing your starting point. Similarly, searching for stores, companies, points of interest of interest, etc. requires that the user knows her location. While most present-day computing devices include an ability to communicate wirelessly with other devices or a network, most present-day computing devices do not include any way to determine the location of the computing device.

The prior art has attempted to solve this deficiency by including global positioning system (GPS) circuitry within laptop computers and cell phones. There are currently a number of different companies that manufacture GPS chips for inclusion in such portable computing and mobile communication devices. However, the addition of such global positioning systems to computing devices suffers from a number of deficiencies. First, the additional circuitry can be expensive. For example, GPS devices can range from several hundred dollars to thousands of dollars. Second, GPS devices typically needed a significant amount of time to acquire position signals from satellites as well as perform the calculations necessary to determine location. For example, an initialization of the GPS circuitry can take several minutes. Even when the GPS device active, it takes a minimum of 35 seconds to establish the initial location of the computing device. Finally, the greatest disadvantage with GPS systems is that they do not function properly inside office buildings and in high density urban environments. The physical structure of the office buildings interferes with the position signals from the satellites which are sensitive to timing differences caused by signal bounces, and are too weak to penetrate many structures.

A second prior art approach uses a database of media access control (MAC) addresses and offers this information over a network such as the Internet as a location-based service. The database includes pairs of locations and MAC addresses. The pair information in the database is determined by hiring drivers in most major cities to map the MAC addresses of access points to locations in their city. To determine a location, the user need only retrieve the location corresponding to the access point MAC address from the database. However, this prior art solution also has a number of shortcomings. First, it requires that the user's computing device have a connection to the Internet in order to access the database and retrieve information from it, or have an extensive local database which may be out of date. Second, the location can only be identified to a level of precision of the transmission range of the access point.

SUMMARY OF THE INVENTION

The present invention overcomes the deficiencies and limitations of the prior art by providing a system and method for geographic tagging of network access points. In one embodiment, the system comprises a plurality of access points that have been configured to provide location information as part of their beacon. In one embodiment, each access point provides a service set identifier (SSID) that includes an encoded value that represents the location of the access point. The use of an encoded location value in the SSID of the access point is particularly advantageous because it does not require any additional hardware be added to the access point or the portable computing device. Moreover, location can be determined by any portable device without establishing a connection to the access point. The portable computing devices are adapted to receive the beacon, extract the location information from the beacon and decode the beacon. The present invention also includes a variety of methods including: a method for geographic tagging of network access points, a method for encoding a location into a geographic code, a method for decoding a geographic code into a location, a method for encoding height into a geographic code, a method for decoding height from a geographic code and a method for determining the location using a plurality of geographic codes.

BRIEF DESCRIPTION OF THE DRAWINGS

The present invention is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
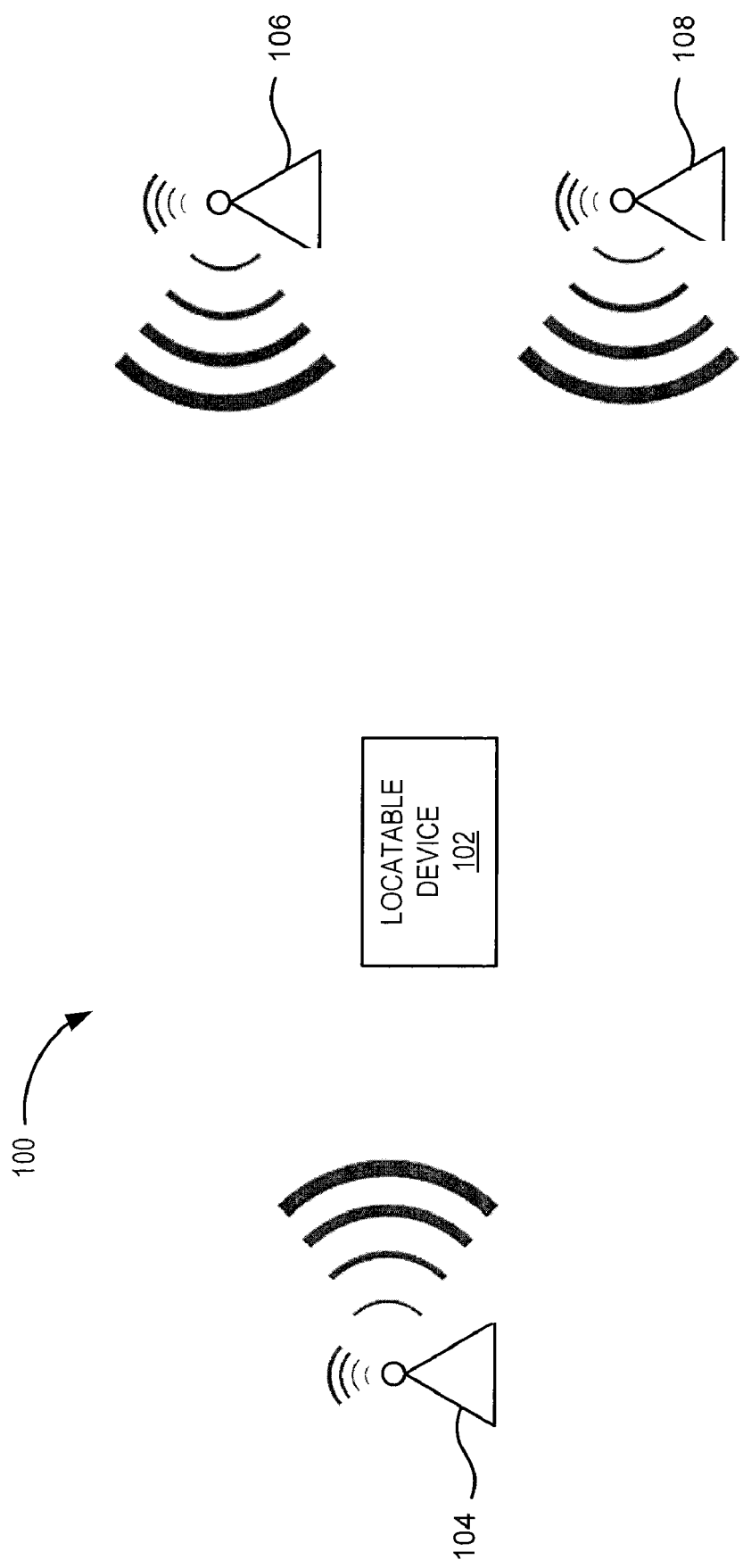
FIG. 1 is a high-level block diagram illustrating a first embodiment of a computing system including of the present invention.

A system and method for geographic tagging of network access points are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in the context of network access points utilized by wireless networks and a portable computing device such as a laptop computer; however, those skilled in the art will recognize that the present invention may be implemented in other systems that that utilize beacon signals that are in part user configurable.

Reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs and magnetic optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

System Overview

FIG. 1 illustrates a block diagram of a distributed computing system 100 including the present invention. The distributed computing system 100 includes a locatable device 102 and a plurality of network access points 104, 106 and 108. The locatable device 102 is adapted for wireless communication with one or more of the plurality of network access points 104, 106 and 108. In one embodiment, the locatable device 102 is movable and the locatable device 102 receives signals to and from each access point 104, 106 and 108 when the locatable device 102 is within the communication range of a particular network access point 104, 106 and 108. Although not shown, the distributed computing system 100 also includes a network. The network (not shown) may comprise a conventional network such as a local area network (LAN), a wide area network (WAN), the Internet or other suitable communication system wired or wireless. The network is coupled to the plurality of network access points 104, 106 and 108.

The locatable device 102 is any computing device capable of receiving a beacon signal and decoding the geographic code embedded within the beacon signal. For example, the locatable device 102 includes a receiver for receiving the beacon and other processing capabilities to extract the geographic code from the beacon signal and decode it. In one embodiment, the locatable device 102 is a portable computing device such as a laptop computer in another embodiment, the locatable device 102 is a mobile communications device with computing capabilities such as a smart phone. In yet another embodiment, the locatable device 102 is any electronic device including a receiver and having other processing capabilities such as a printer, an audio recorder, a camera, a motion sensor, a photocopier, a diagnostic device, etc.

The plurality of access points 104, 106 and 108 are of a conventional type such as wireless access points used in computer networking. Although three access points 104, 106 and 108 are shown in FIG. 1 for illustration purposes, those skilled in the art will recognize that the principles of the present invention will work in any system that has a least one access point. The network access points 104, 106 and 108 are devices that that connect wireless communication devices (e.g. the locatable device 102) together to form a wireless network. In one embodiment as noted above, each of the plurality of access points 104, 106 and 108 may be coupled to a wired network. In another embodiment, they are nodes of a wireless mesh network. The plurality of access points 104, 106 and 108 are used to relay data between wireless devices and wire devices. In one embodiment, the access points communicate using the IEEE 802.11 standard, although in other embodiments beacon signals of other standards may also be used in accordance with the principles of the present invention. Unlike the prior art, the plurality of access points 104, 106 and 108 are geographically tagged with location information. In one embodiment, the location information is the position of the access point 104, 106 and 108 in terms of longitude and latitude. In another embodiment, the location information also includes the height of the access point. This location information is encoded into a geographic code. In another embodiment, the location information encoded into a first geographic code and second geographic code or a prefix and a geographic code. In accordance with the present invention, the geographic code(s) is included as part of the beacon signal or frame and transmitted by the access points 104, 106 and 108 to other devices within range. For example, the beacon signal or frame is transmitted by the access point 104, 106 and 108 several times a second. The geographic code(s) as part of the beacon signal is described below in more detail with reference to FIG. 3. In particular, for the configuration shown in FIG. 1, the first access point 104 would transmit a beacon signal including a first geographic code representing an encoded value of its location; the second access point 106 transmits a beacon signal including a second geographic code representing an encoded value of its location which is different from the location of the first access point and does be second geographic code is different than the first geographic code; and the third access point 108 transmits a beacon signal including a third graphic code representing and coded value of its location which is different from the location of both the first access point 106 and second access point 108.

Figure 2:
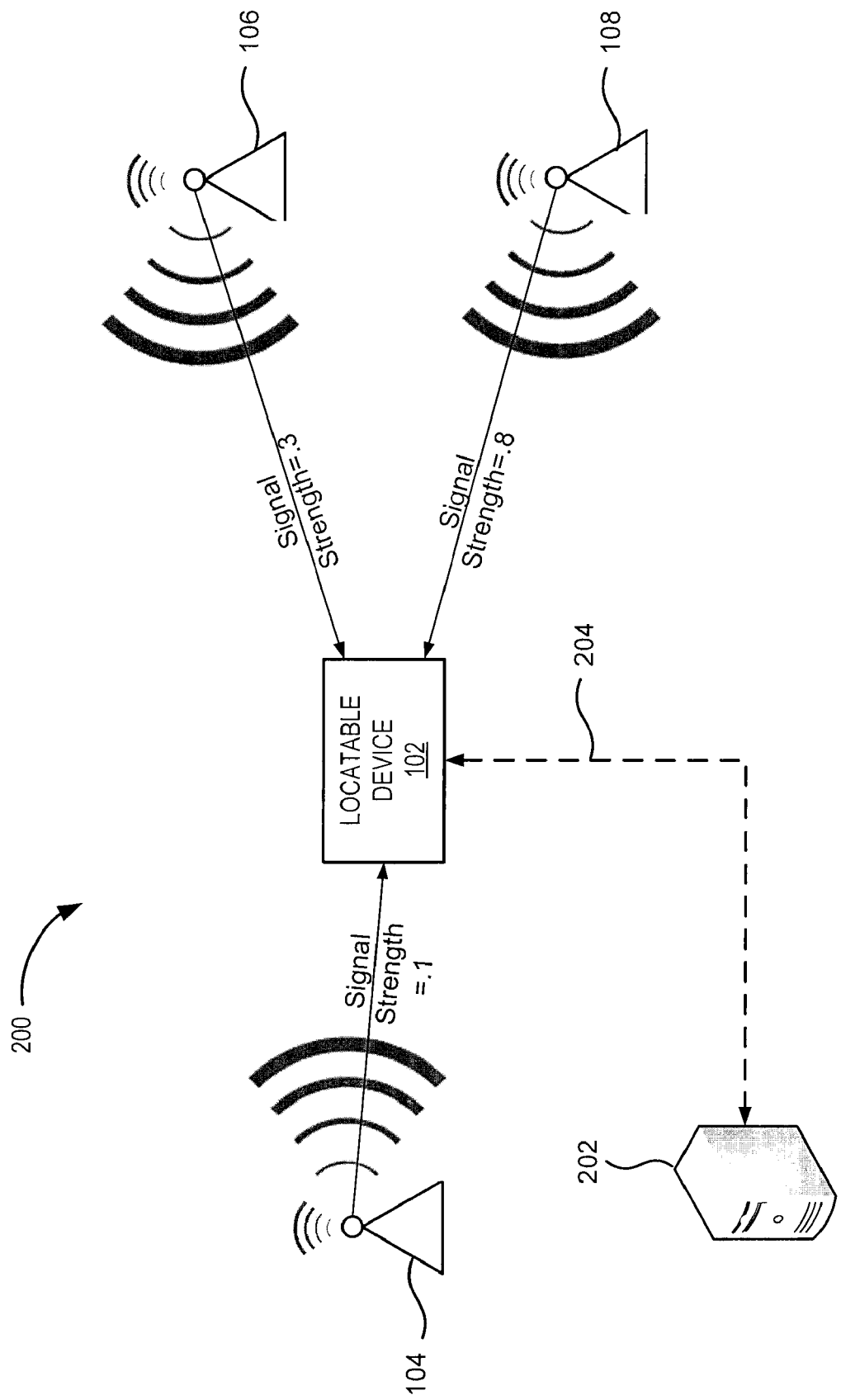
FIG. 2 is a high-level block diagram illustrating a second embodiment of a computing system including of the present invention.

Referring at FIG. 2, another embodiment of the system 200 is shown. The system 200 includes the locatable device 102, the first access point 106, the second access point 108, and the third access point 108. These components have a similar form and function as that described above with reference to FIG. 1 so that description will not be repeated here. The system 200 also includes a geolocation service provided from a server 202 and a network connection 204 from the locatable device 102 to the server 202. In one embodiment, the geolocation service provided from the server 202 provides additional information related to particular geographic locations in response to requests. The network connection 204 from the locatable device 102 to the server 202 may be for example a wireless network connection provided by a mobile communications carrier to a smart phone. Using the added functionality provided by the network connection 204 and the server 202, the locatable device 102 can determine its location using the geographic codes from the access points 104, 106 and 108, and request services or information based on its location from the geolocation service provided by the server 202.

The Geographic Codes

Figure 3:
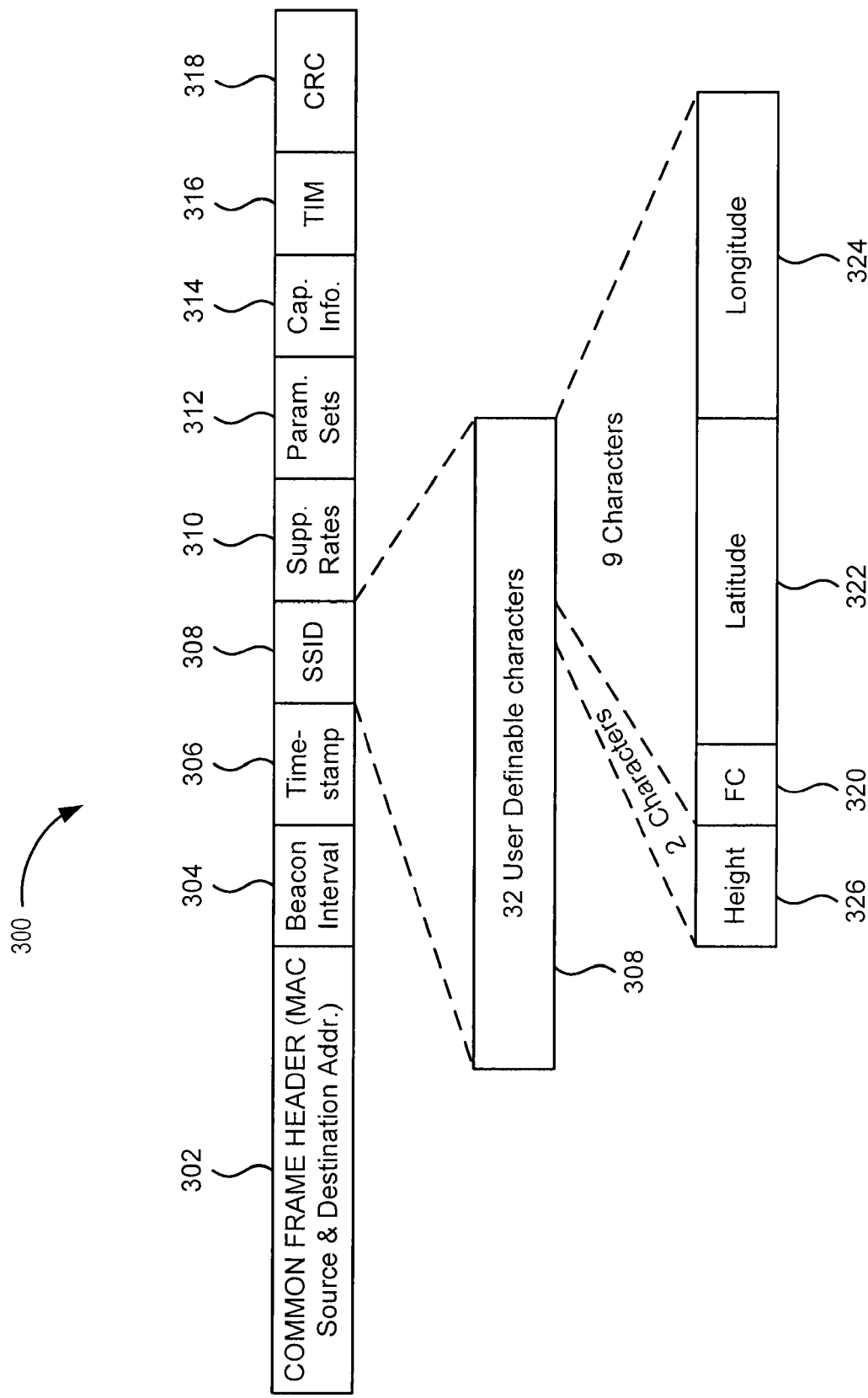
FIG. 3 is block diagram of a service set identifier and geographic codes according to one embodiment of the present invention.

Referring now to FIG. 3, one embodiment for the geographic codes used in the present invention will be described. FIG. 3 is a block diagram of a beacon frame or signal 300 in accordance with the present invention. The beacon frame 300 preferably comprises a common frame header 302, a beacon interval 304, a timestamp 306, a service set identifier (SSID) 308, supported rate field 310, a parameter set field 312, capability information field 314, a traffic indication map (TIM), and a cyclical redundancy check (CRC) field. In general, the beacon frame 300 is approximately 50 bytes long.

The common frame header 302 includes source and destination MAC addresses as well as other information regarding the communications process. The destination address is always set to all ones, which is the broadcast Medium Access Control (MAC) address. This forces all other stations on the applicable channel to receive and process each beacon frame. The common frame header 302 is about have of the beacon frame 300.

The beacon interval 304 includes a value that represents the amount of time between beacon frame 300 transmissions. Before any locatable device 102 enters a power save mode, the locatable device 102 needs the beacon interval to know when to wake up to receive the next beacon and learn whether there are buffered frames at the access point 104, 106 and 108.

The timestamp 306 is a value of the network clock corresponding to the access point 104, 106 and 108. After receiving a beacon frame 300, the locatable device 102 uses the timestamp value to update its local clock. This process enables synchronization among the locatable devices 102 that are associated with the same access point 104, 106 and 108.

The supported rate field 310 stores information about the supported rates. Each beacon frame 300 carries information that describes the rates that the particular wireless LAN supports. For example, a beacon frame 300 may indicate that only 1, 2, and 5.5 Mbps data rates are available. As a result, the locatable device 102 would stay within limits and not use 11 Mbps. With this information, locatable devices 102 can use performance metrics to decide which access point 104, 106 and 108 with which to associate.

The parameter set field 312 includes information about the wireless parameters. The beacon frame 300 includes information about the specific signaling methods (such as frequency hopping spread spectrum, direct sequence spread spectrum, etc.). For example, a beacon frame 300 would include in the appropriate parameter set the channel number that an access point 104, 106 and 108 is using. Likewise, a beacon frame 300 belonging to frequency hopping network would indicate hopping pattern and dwell time.

The capability information field 314 store capability information for network access. The capability information identifies requirements of locatable devices 102 that wish to belong to the wireless LAN that the beacon frame 300 represents. For example, this information may indicate that the locatable devices 102 must use wired equivalent privacy (WEP) in order to participate on the network.

The traffic indication map (TIM) 316 is sent in the beacon frame 300 to identify which stations using power saving mode have data frames waiting for them in the access point's buffer. The TIM 316 identifies the locatable devices 102 by the association ID that the access point 104, 106 and 108 assigned during the association process.

The cyclical redundancy check (CRC) field 318. The CRC field 318 provides error detection capability.

The service set identifier (SSID) 308 is a user definable and human readable name that identifies an access point 104, 106 and 108, and thus, its corresponding wireless LAN. Before associating with a particular wireless LAN, a locatable device 102 must have the same SSID 308 as the access point 104, 106 and 108. By default, access points 104, 106 and 108 include the SSID 308 in the beacon frame 300 to enable sniffing functions (such as that provided by Windows XP) to identify the SSID 308 and automatically configure the wireless network interface card (not shown) with the proper SSID 308. Some access point vendors have an option to disable the SSID 308 from being broadcast in the beacon frame 300 to reduce security issues. The service set identifier (SSID) 308 is typically 32 user definable ASCII characters. During set up of the access point 104, 106 and 108, the user has the ability to set the value of the SSID 308. For example, networks are often named by system administrators with descriptive names that the users will recognize when they attempt to associate with the access point 104, 106 and 108.

As shown in FIG. 3, the present invention advantageously encodes the precise geographic coordinates of the access point 104, 106 and 108 into a geographic code, and inserts that geographic code as part of the SSID 308. While the description below will describe the geographic code and SSID 308 for a particular access point 104, those skilled in the art will recognize that the geographic codes and SSIDs 308 of the other access points 106 and 108 have a similar form and functionality.

In one embodiment, the geographic code is an encoded value of the precise geographic coordinates (longitude and latitude) of the access point 104. In this embodiment, the geographic code is the last nine characters of the SSID 308. The geographic code comprises a first character 320 encoding multiplier values, four characters representing a latitude value, and four characters representing the longitude value, LONCODE 324. The encoding scheme of the present invention will be described in more detail with reference to FIG. 5 below. It is particularly advantageous for the geographic code to be the last nine characters of the SSID 308 because it allows the preceding 23 characters to be used in a conventional manner by the user or system administrator to give the access point 104 a human readable name that the user will recognize. However, those skilled in the art will recognize that the geographic code of the present invention could be in any other position within the SSID 308. Furthermore, the nine characters used for geographic code need not be contiguous.

In another embodiment, the SSID 308 also includes two additional characters for storing a second geographic code or prefix representing the height of the access point 104. In this embodiment, the two additional characters precede the nine characters for the geographic code. Those skilled in the art will recognize that in other embodiments these two characters could be in any other position within the SSID 308. The use of SSID 308 with encode values is particularly advantageous because it does not have adverse effects on the access point 104 as a router. Furthermore, since most access points 104 broadcast SSID information several times a second, whether or not a user can connect to that access point 104, the SSID can be listened to passively be a radio receiver. This can be done with very low power on the locatable device 102, which never needs power a transmitter to get the information.

General Method

Figure 4:
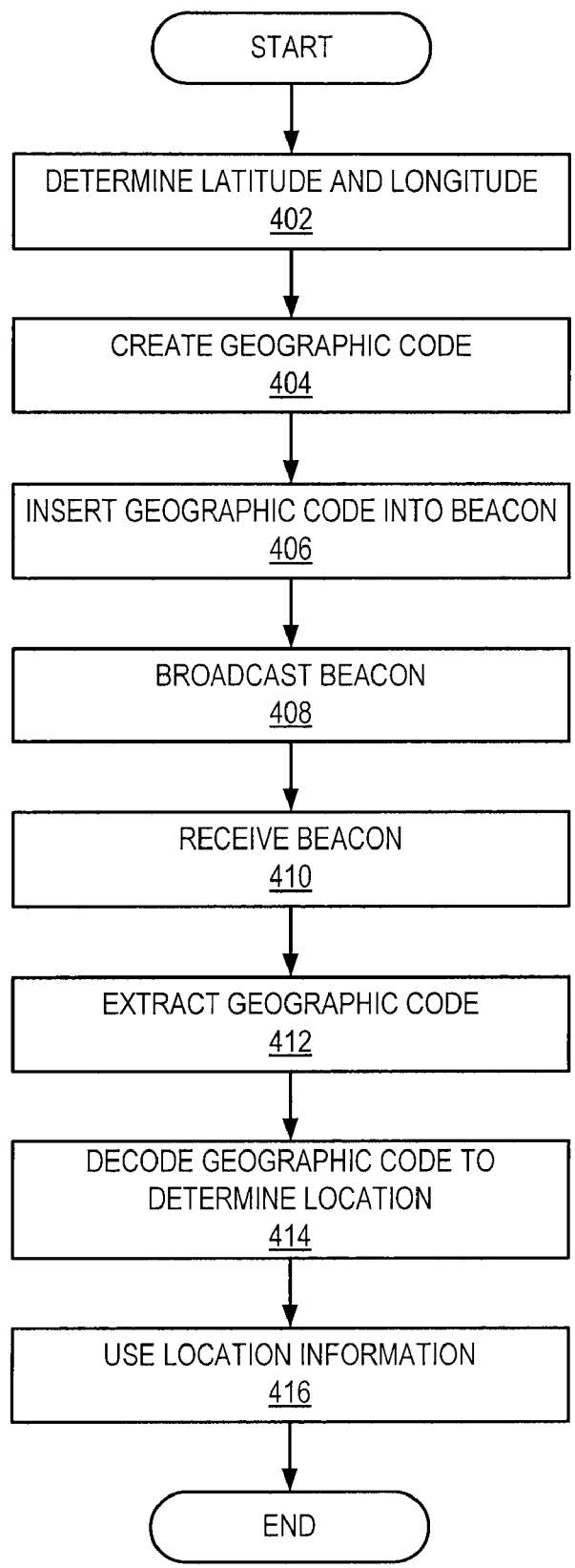
FIG. 4 is a flowchart illustrating a general process for geographic tagging of network access points according to one embodiment of the present invention.

Referring now to FIG. 4, an embodiment of a method for geographic tagging in accordance with the present invention will be described. By way of example and for ease of understanding, the method will be described in the context of a particular access point, access point 104, however those skilled in the art will recognize that the portions of the process described below may be repeated for any number of access points (e.g., 106 and 108). The process begins by determining 402 the latitude and longitude for a given access point 104. In order to create the geographic code, a user must precisely specify the latitude and longitude coordinates for the access point 104. One method is to use a mapping program, such as Google Maps, to allow a user to place a marker and the latitude and longitude coordinates are returned. In another embodiment, an external location device such as a GPS device can be placed near the access point 104 and the latitude and longitude coordinates determined that way or any other similar manual manner. In yet another embodiment, the location of the device could be manually compared to precise survey data produced by any of a number of standard surveying techniques.

Next, the method creates 404 a geographic code. The precise geographic coordinates are encoded using a compact encoding into the geographic code. As has been described above with reference to FIG. 3, in one embodiment the geographic code is a nine character encoded value. In another embodiment, a first geographic code and a second geographic code or prefix are used with the first geographic code being a latitude and longitude and the second geographic code being a height. The processes for creating these geographic codes will be described in more detail below with reference to FIGS. 5 and 7.

Next, the method inserts 406 the geographic code into the beacon signal of the access point 104. For example, most access points 104, 106 and 108 allow the installer or person who sets up the access point to configure the service set identifier (SSID) 308 which is broadcast as part of the access point's beacon. This can be done at set up for example with a computer (not shown) connected to the access point 104. The SSID 308 is provided to the access point 104 such as through a graphical user interface in which the user inputs the desired SSID value into a dialog box and the SSID value is stored at the access point 104 for broadcast as part of the beacon. For example, the user would use conventional access point management software to insert the code as the final characters of the access point SSID 308. In one embodiment, only a single code with the longitude and latitude is inserted in step 406. In another embodiment, a first and second code are inserted in step 406, the second code being 2 characters in length and representing the height and the first code being nine characters in length and representing the longitude and latitude. In one embodiment, the geographic codes are inserted at the end of the SSID 308. This approach is advantageous because this allows the remaining 21 or 23 characters of the SSID code to be used for words easily recognizable why users to distinguish this access point from other access points. However those skilled in the art will recognize that the geographic codes can be positioned at any agreed upon character locations within the SSID.

It should be understood that steps 402, 404, 406 can be repeated for any number of access points, and once each of these steps performed for each access point 104, 106 and 108, they have been geographically tagged in accordance with the present invention.

Then the access point 104 broadcasts 408 the beacon including the geographic code(s).

The general method continues to use these geographic tags once the access points 104, 106 and 108 have been configured with them.

The locatable device 102 receives 410 the beacon signal from a particular access point 104. Next, the locatable device 102 extracts 412 the geographic code from the received beacon signal. This can be performed by software operable on the locatable device 102. In one embodiment, since the locatable device 102 knows that the geographic code is located within the SSID 308, the locatable device 102 need only determine the SSID 308 and extract the characters representing the geographic code from the SSID 308. In one embodiment, the geographic code is the last 9 characters of the SSID 308. In another embodiment, the geographic codes are the last 11 characters of the SSID 308. Next, the method continues by decoding 414 the geographic codes to determine the geographic location of the access point 104. In one embodiment, the method decodes the first geographic code representing the longitude and latitude. In another embodiment, the method also decodes a second geographic code representing the height. Embodiments of the decoding process are described in more detail below with reference to FIG. 6 and FIG. 8. Once the geographic location has been determined, it can be used 416 for any number of applications. For example, as will be described below with reference to FIG. 9, a geographic location of the access point 104 can be used to determine a precise location of the locatable device 102.

Encoding Method

Figure 5:
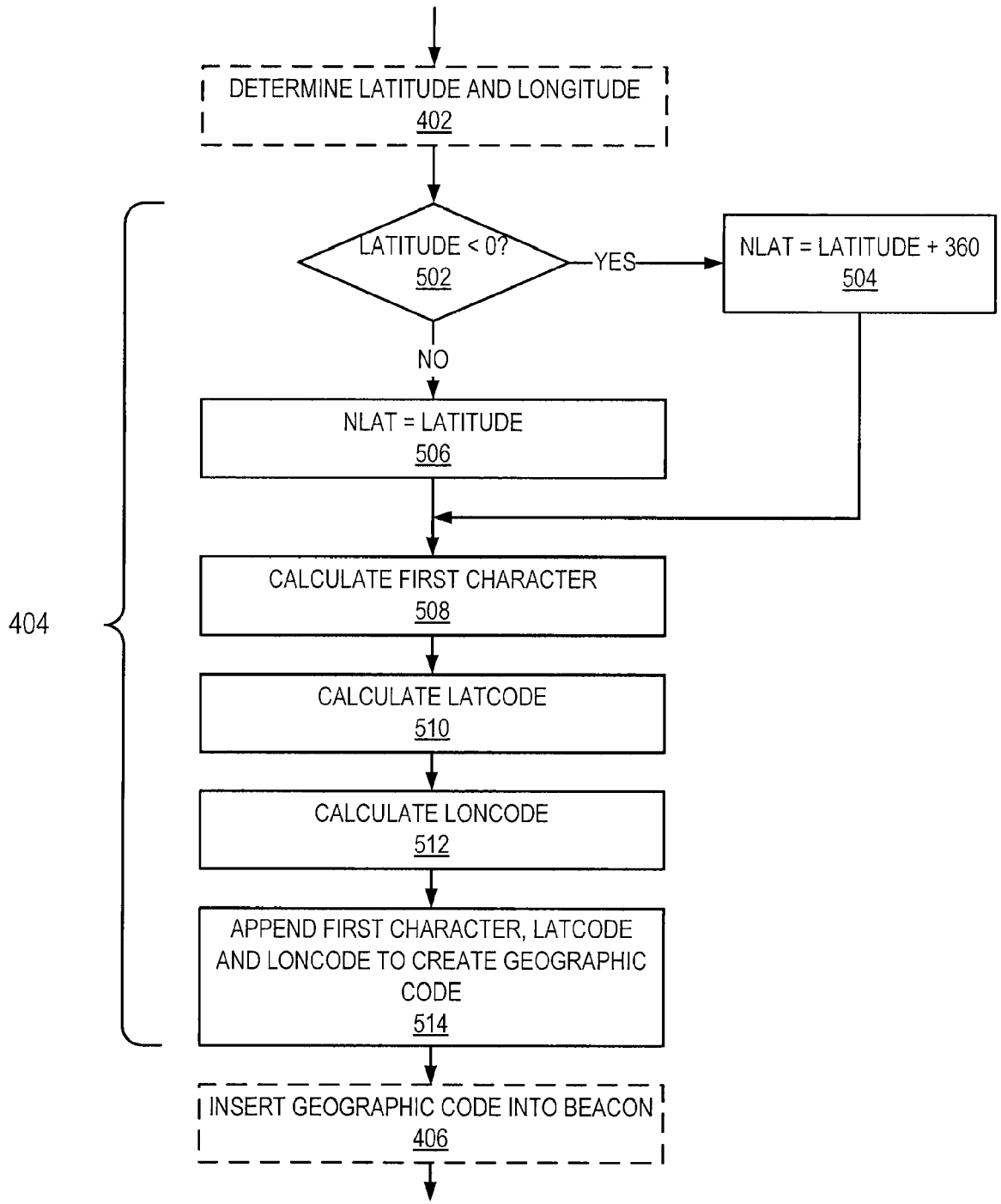
FIG. 5 is a flowchart illustrating a process for encoding a geographic location into a geographic code according to one embodiment of the present invention.

Referring now to FIG. 5, one embodiment of a method for encoding a geographic location into a geographic code in accordance with the present invention will be described. The present invention generates a geographic code by encoding the latitude and longitude into a pair of Base 60 numbers with the two highest order bits from each combined into an initial hex digit. The resulting geographic code uses nine characters to encode a position which is precise to a distance of roughly 2.5 feet at the equator.

As shown in FIG. 5, the longitude and latitude of an access point 104 have already been determined (see step 402 shown with dashed lines). The method begins by scaling the longitude and latitude to $0 <= x < 360$. The method then determines 502 whether the latitude is less than zero. Since the latitude is often referred to in terms of north and south latitudes, with north represented in positive degrees and the south represented in negative degrees, one embodiment of the present invention scales the latitude to be in the range of 0° to 360°. Thus, if it is determined 502 that the latitude has a negative value, the method continues to step 504 to use as a value of the latitude, NLAT, the latitude plus 360°. If it is determined 502 that the latitude does not have a negative value then the method continues to step 506 to use as a value of the latitude, NLAT, the latitude value determined in step 402. The method represents the latitude and longitude each as a 5-character string by multiplying their value by 144000, rounding to the nearest integer, and converting the result to Base 60 using the "digits" 0-9, A-Z, and a-x. Next, the method continues by calculating 508 the value of the first character 320. In one embodiment, the first character 320 is computed by taking the high-order character of the latitude, multiplying by 4, and adding the high-order character of the longitude to form a hex digit. The first digit of the longitude (in the range of 0-3 because it is a multiplier of 90 degrees and the range is 0-270) is multiplied by 4 and added to the first digit of the latitude which results in a number between 0 and 15 (a hex digit). This can be generated directly using the equation first character=inttochar((LON/90)*4+NLAT/90) where LON is the longitude value from step 402 and NLAT is the latitude value from either step 504 or 506. Then the method calculates 510 the value of the LATCODE 322. In one embodiment, the LATCODE 322 is calculated by taking the four lower-order characters of the latitude. This can be generated directly using the equation LATCODE=inttobase60((NLAT*144000) % 12960000). Then the method calculates 512 the value of the LONCODE 324. In one embodiment, the LONCODE 324 is calculated by taking the four lower-order characters of the longitude. This can be generated directly using the equation LONCODE=inttobase60((LON*144000) %12960000). The creation of the geographic code is completed by appending 514 the first character 320, the LATCODE 322 and the LONCODE 324. Once created, the geographic code can be inserted 406 into the beacon signal. Those skilled in art will recognize that above encoding scheme is just one of many that may be used. For instance, in a preferred embodiment, a different set of symbols could encode the base 60 number, for instance replacing the "O" and "1" characters with "y" and "z" respectively, to prevent confusion of those characters with the "0" and "1" digits when typing the code. Other encoding schemes may be used with more or less accuracy and more or fewer characters. For example, the code for latitude 37.42195, longitude −122.21386 would be expressed as the geographic code "8yuqfcVQi".

By inserting this geographic code as the final nine characters of the SSID 308, the present invention makes the access point 104 a precise location beacon. This is advantageous because the beacon is more accurate than GPS, requires no additional hardware, and with the plethora of access points multiple beacons can be received by a locatable device 102 for position accuracy within 3 meters.

Figure 7:
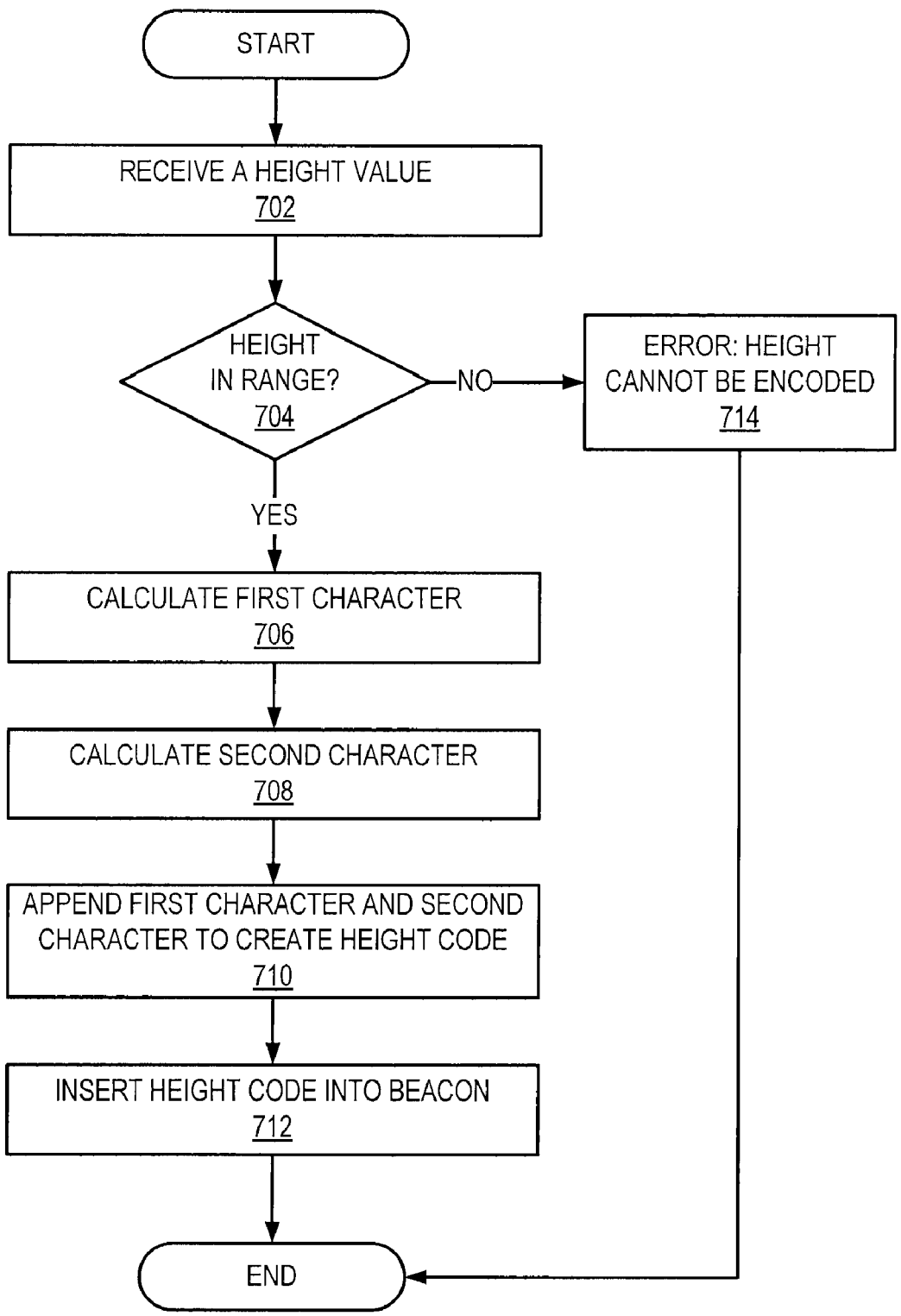
FIG. 7 is a flowchart illustrating a process for encoding a height into a geographic code according to one embodiment of the present invention.

Referring now also to FIG. 7, an embodiment of a method for encoding the height or altitude into the second geographic code or prefix in accordance with the present invention will be described. This embodiment includes height or altitude information as a two digit additional code that provides 600 possible height codes by allowing the first digit of the pair to represent a multiplier from 0-9, and the second to represent a base 60 number encoded just as specified above. This allows some structural redundancy to reduce the accidental appearance of a height code as part of an ordinary SSID word. The method begins by receiving 702 a height value. Next, the method determines 704 whether the height value is within a range that can be encoded. Since the present invention uses compact encoding and only uses two characters, the range of heights that can be encoded is limited to a range of approximately 1200 feet below ground to 4790 feet above ground. If the method determines 704 that the received height is not within that range, the method indicates 714 an error that the height cannot be encoded and the method ends. On the other hand, if the method determines 704 that the height is within the acceptable range, the method continues to step 706. In one embodiment, the value of the height is converted to two characters in base 60. In step 706, the method calculates 706 the value of the first character. The first character is generated by adding 1200 to the height value, dividing the sum by 600 and converting that amount to base 60. Next in step 708, the value of the second character is calculated. In one embodiment, the second character is determined by dividing the received height by 10 and converting the result into a base 60 value. Next, method appends 710 the first character and the second character to create a two character height code. For example, 0 (zero) feet above ground would be the prefix "20". The "20" prefix would be unused, redundant with the simpler 9 character code. Ten feet above ground would be the prefix "21" and 1190 feet below ground would be the prefix "01".

Then the method inserts 712 the two character height code into the beacon signal. It should be clear to one skilled in the art that a further extension of this height code, using additional characters or using different symbols, could be easily constructed.

The particular embodiment for encoding geographic information has several valuable properties. Because it uses only visible and easily typed characters, and is relatively short, it is easy for a human to enter these codes into the access point SSID. By positioning it at the end of the SSID field, the code is easily detected as a code with fewer false positive results than scanning the entire SSID for such codes at any position. These code properties would also be valuable for attaching the codes to other forms of electronic data, such as documents or images, in fields originally intended to contain human readable codes.

Decoding Method

Figure 6:
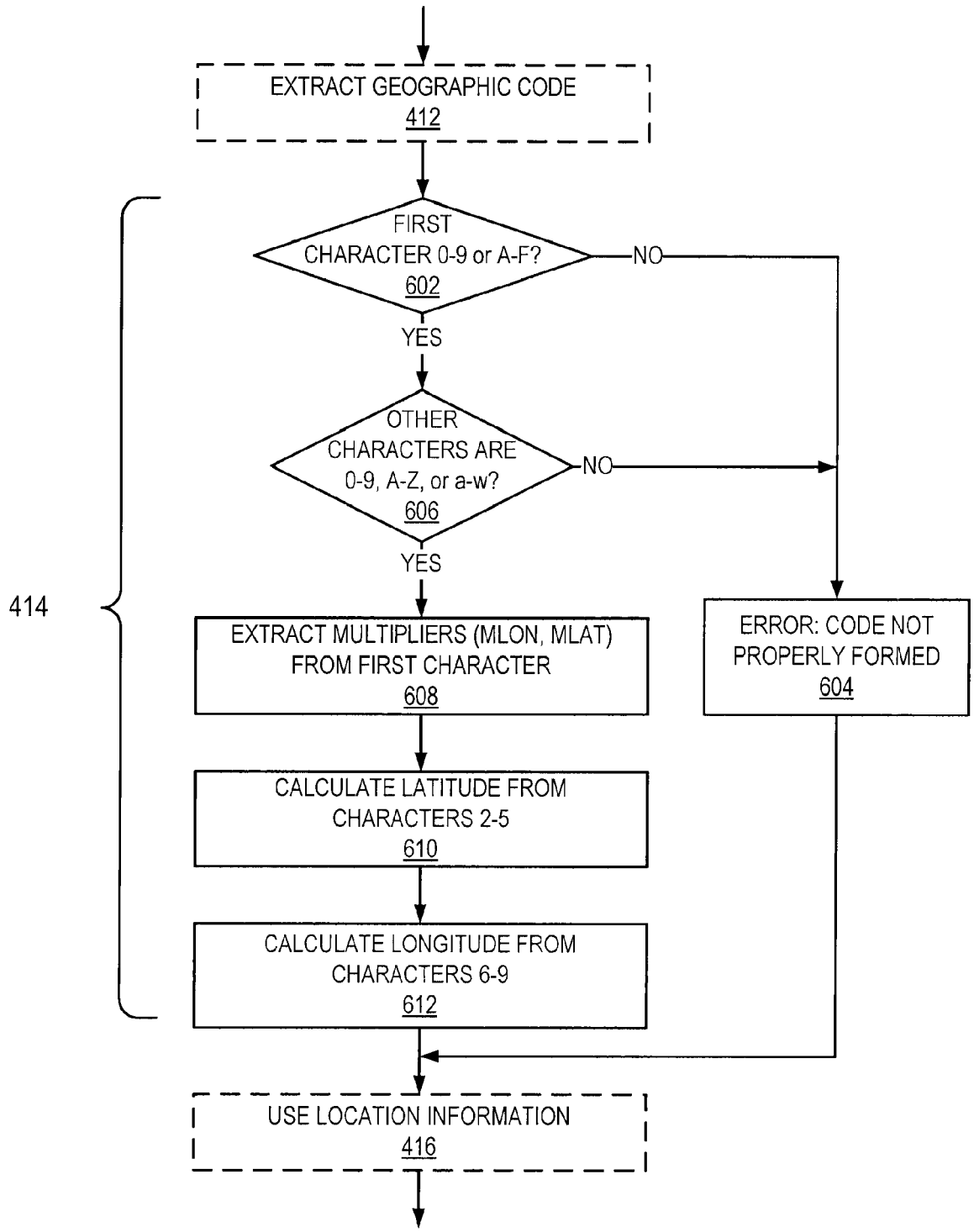
FIG. 6 is a flowchart illustrating a process for decoding a geographic code into location according to one embodiment of the present invention.

Referring now to FIG. 6, one embodiment of a method for decoding a geographic code into a location will be described. It should be noted that the locatable device 102 does not need to be connected to the internet through the access point 104; it merely needs to be able to receive the beacon signal. This is particularly advantageous because the locatable device 102 receives location information by listening to the access point broadcast a beacon. The beacon is always broadcast multiple times per second and includes the SSID which contains encoded latitude and longitude information. All WiFi access points support SSID broadcast and all can easily add the encoded information.

The method begins with a geographic code such as has been produced by the extraction step 412. Next, the method determines the 602 whether the first character of the geographic code is within a proper character range. For example, using the encoding scheme described above with reference to FIG. 5, the first character of the geographic code must be a character from 0-9 or A-F (e.g., any hex character). If the method determined 602 that the first character is not within the proper character range, the method signals or outputs 604 an error indicating that the code was not properly formatted or that the characters extracted are not a geographic code. On the other hand if it was determined 602 that the first character was within the proper character range, the method continues in step 606 to determine whether the other characters are within a proper character range. In one embodiment, the proper character range for the other characters is 0-9, A-Z or a-x. Again, using the encoding scheme described above with reference to FIG. 5, the remaining characters of the geographic code must be an character from 0-9, A-Z or a-x. If the method determined 606 that any of the remaining characters are not within the proper character range, the method proceeds to step 604 to signal or output and error signal indicating that the code is not properly formatted.

However if the method determined 606 that all of the remaining characters are within the proper character range, the method continues to step 608. In step 608, the method extracts a pair of multipliers, MLAT and MLON, from the first character. The first multiplier is a latitude multiplier and the second multiplier is a longitudinal multiplier. The first and second multipliers are generated by converting the first character from hex to integer, using the two lower digits as the MLAT and the two higher digits as the MLON. These multipliers are used to re-create the longitude and latitude values from the geographic code. Then the method calculates 610 the latitude from the second through fifth characters of the geometric code. In one embodiment, the latitude is equal to base60toint(char2-5)+(90*MLAT). Finally, the method calculates 612 the longitude from the sixth through ninth characters. In one embodiment, the longitude is equal to base60toint(char6-9)+(90*MLON). For example, the code "8yuqdcVQp" represents the geographic coordinates latitude 37.42194, longitude −122.21381.

Figure 8:
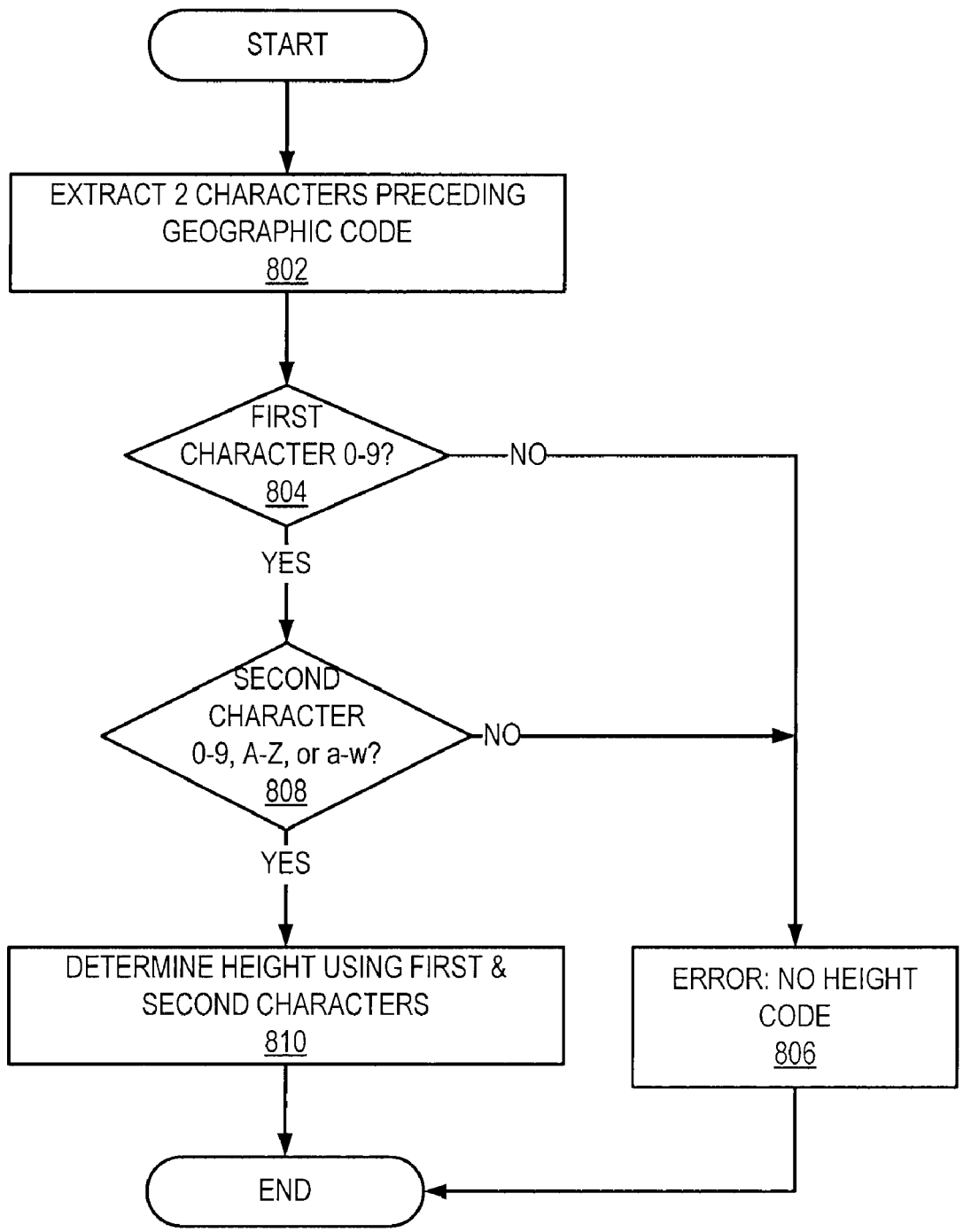
FIG. 8 is a flowchart illustrating a process for decoding a geographic code into height according to one embodiment of the present invention.

Referring now to FIG. 8, one embodiment of the method for calculating a height value of an access point from a prefix or geographic code will be described. The method begins by extracting 802 the prefix or second geographic code. Similar to the first geographic code, the prefix or second geographic code may be part of the SSID 308 broadcast by the access point 104, 106 and 108. The method determines 804 whether the first character of the second geographic code is within a proper range. In one embodiment, the proper range for the first character of the second geographic code is from 0-9. If the method determined 804 that the first character of the second geographic code was not within the proper range, the method proceeds to step 806 to output or signal an error indicating that either there was no height code included in the SSID 308 or that the height code was not properly formatted. On the other hand if the method determined 804 that the first character of the second geographic code was within the proper range, the method proceeds to step 808 to determine whether the second character is also within the proper range. In one embodiment, the proper range for the second character is 0-9, A-Z or a-x. If the method determined 808 that a second character was not within the proper range, the method continues to step 806 as has been described above to output an error code and then ends. If however, the second character is determined 808 as within the proper range, the method determines 810 the height using the first character and the second character. In one embodiment, the specified height is in base 60. The height can be calculated by converting the second character from base 60 to an integer value and multiplying the result by 10 then adding the value of converting the first character from base 60 to an integer value and multiplying that integer value by 600 and subtracting 1200. This can be computed directly with the equation height=base60toint(char 2)*10+(600*base60toint(char 1)−1200). This provides a value of the height of the access point 104 above ground. For cases, where the access point is below ground, the code can give a value to a depth of 1200 feet.

These decoding methods are particularly advantageous because they allow the locatable device to location with accuracy greater than GPS, within a fraction of a second, and even in dense urban environments and inside of buildings.

EXAMPLE

Figure 9:
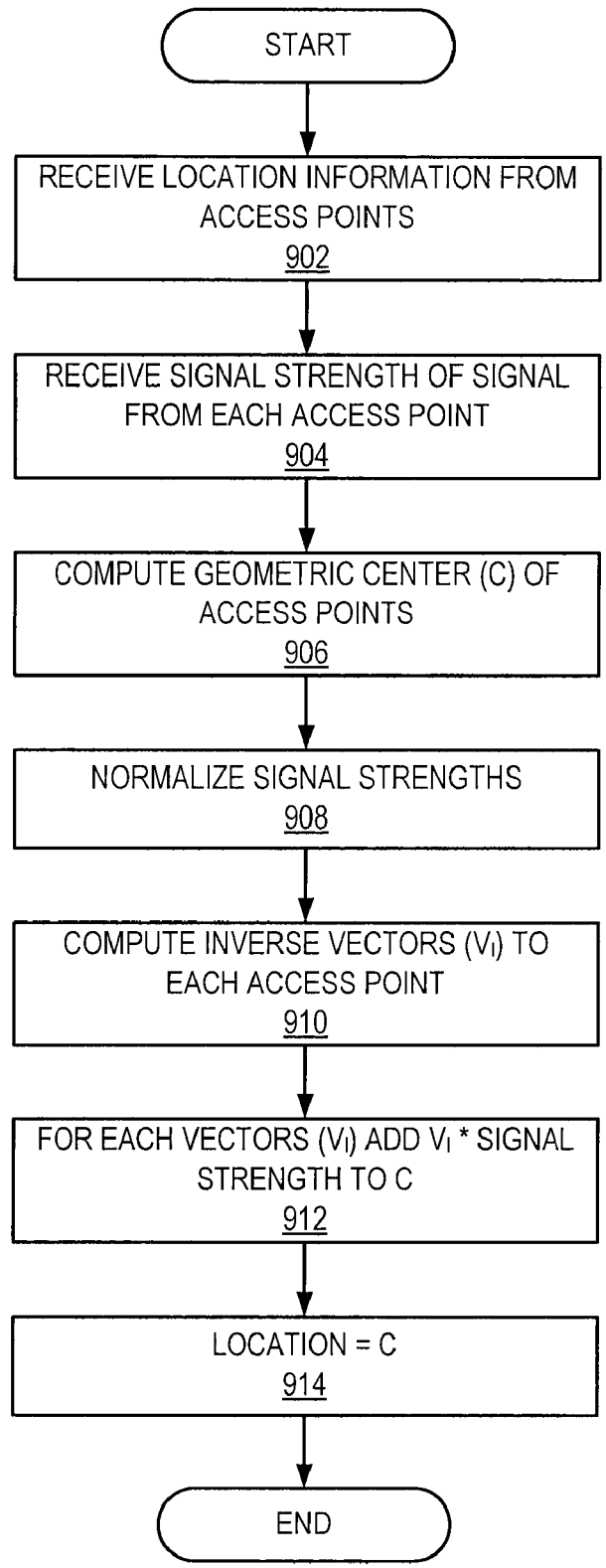
FIG. 9 is a flowchart illustrating a process for determining a location of a computing device using the beacon signals network access points according to one embodiment of the present invention.

Referring now to FIG. 9, one embodiment of a method for determining the location of the locatable device 102 will be described. The method begins by receiving 902 location information from a plurality of access points 104, 106 and 108. For example the location information can be a geographic code or a prefix and a geographic code. In one embodiment, the method receives location information from at least three access points. While the geographic information from one access points can be used to determine the general location, it will result in a number of possible locations. Next method determines the signal strength of the signal received from each access point 104, 106 and 108. Referring now also to FIG. 2, example signal strengths for each access point is shown. The method then computes 906 the geometric center, C, of the access points 104, 106 and 108. Next method normalizes 908 the signal strength received from each access point 104, 106 and 108. For example, the signal strength between the first access point 104 and the locatable device 102 is 0.1; the signal strength between the second access point 106 and the locatable device 102 is 0.3; and finally, the signal strength between the third access point 108 and the locatable device 102 is 0.8. Then the method computes 910 an inverse vector, $V_i$, to each access point. Then the method modifies the value of the geometric center, C, by adding 912 the inverse vector, $V_i$, multiplied by its corresponding signal strength, $S_i$ to the calculated geometric center from step 906. This step of addition 912 is performed for each vector computed in step 910. This effectively adjusts the computed center of the access points 104, 106 and 108 for the relative signal strengths of each access point 104, 106 and 108 as received by the locatable device 102. The end result is that the location of the locatable device 102 is equal 914 to the modified value of the geometric center. Those skilled in the art will recognize that the above method can be modified to use height codes as well. In such an embodiment, the method is similar, except the third dimension is added to each vector computation. Thus, a 3-dimensional centroid between codes is computed, and each signal strength adjustment is performed using a 3 element position vector.

It is clear that access points might be mislabeled, either as an attack or simply because an SSID happens by accident to appear to be a valid code. In such cases, the software attempting to fix location might cross-check the distances between the access points, and reject points which appear to be clearly incorrect. For example, an 802.11 access point has a range of approximately ten meters under normal operating conditions. If one of the labels appears to indicate that one access point is three miles from two or more other access points currently visible, then that access can be assumed to have been mislabeled and the data from that access point ignored for purposes of location computation. Alternatively, the locatable device 102 might check against other information sources, such as a GPS receiver or accelerometer, to determine that some access point labels should be ignored. For example, an access point that appeared to contradict a high confidence GPS location might be ignored if it appears to be outside the accuracy limits of the GPS signal, or it might be used by preference as more precise if it fell within the accuracy limits of the GPS signal. Alternatively, if the device is known by accelerometer to have traveled less than a hundred feet, but suddenly an access point becomes visible indicating that a hundred miles have been traversed, we can assume that the new access point label is incorrect.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A method for geographically tagging a wireless network access point, the method comprising:
   determining a location of the wireless network access point including a latitude value and a longitude value of the access point;
   generating a first string by multiplying the latitude value by a first constant and converting it to base 60;
   generating a second string by multiplying the longitude value by the first constant and converting it to base 60;
   creating a geographic code by appending a first character produced by multiplying a highest order character of the second string by a second constant and adding it to a highest order character of the first string, a second to fifth characters using four lowest order characters of the first string and a sixth to ninth characters using four lowest order characters of the second string to represent the location of the wireless network access point; and
   broadcasting the geographic code as part of a beacon signal normally output by the wireless network access point,
   wherein base 60 is a number system that uses 60 digits.

2. The method of claim 1 wherein the beacon signal is output several times per second by the wireless network access point.

3. The method of claim 1 comprising inserting the geographic code into a service set identifier, and wherein broadcasting the geographic code including broadcasting the service set identifier.

4. The method of claim 3 wherein the geographic code is 9 characters of the service set identifier.

5. The method of claim 1 wherein creating the geographic code comprises encoding precise geographic coordinates of the wireless access point using compact encoding.

6. The method of claim 1 wherein the first constant is 144000 and the second constant is four.

7. The method of claim 1 comprising:
   determining a height of the wireless network access point;
   creating a prefix representing the height of the wireless network access point; and
   wherein broadcasting includes broadcasting the prefix.

8. The method of claim 7 wherein the prefix is 2 characters of the service set identifier.

9. The method of claim 7 wherein creating the prefix comprises:
   generating a first character by adding 1200 to a height value, dividing it by 60 and converting that amount to base 60;
   generating a second character by dividing the height value by 10 and converting the result to base 60; and
   appending the first character and the second character together as the prefix.

10. The method of claim 1 comprising:
    receiving the beacon signal at a locatable device;
    extracting at the locatable device the geographic code;
    decoding at the locatable device the geographic code to determine the location of the wireless access point.

11. The method of claim 10 wherein extracting at the locatable device the geographic code includes removing the geographic code from a service set identifier of the beacon signal.

12. The method of claim 11 wherein the geographic code is 9 characters of the service set identifier.

13. The method of claim 10 comprising:
extracting at the locatable device a prefix; and
decoding at the locatable device the prefix to determine a height of the wireless access point.

14. The method of claim 10 wherein decoding at the locatable device the geographic code to determine the location comprises:
determining a first and second multiplier from a first character of the geographic code;
determining a latitude of the location based at least in part on the first multiplier and a first plurality of characters of the geographic code; and
determining a longitude of the location based at least in part on the second multiplier and a second plurality of characters of the geographic code.

15. A method for generating a geographic code for an access point, the method comprising:
receiving location information corresponding to the access point including a latitude value and a longitude value of the access point;
generating a first string by multiplying the latitude value by a first constant and converting it to base 60;
generating a second string by multiplying the longitude value by the first constant and converting it to base 60; and
creating a geographic code by encoding the location information using a compact encoding scheme including appending a first character produced by multiplying a highest order character of the second string by a second constant and adding it to a highest order character of the first string, a first plurality of characters from the first string and a second plurality of characters from the second string,
wherein base 60 is a number system that uses 60 digits.

16. The method of claim 15, wherein the location information is received from at least one of a mapping program, a GPS device and survey data produced by a standard surveying technique.

17. The method of claim 15, wherein the geographic code need not be contiguous.

18. The method of claim 15, wherein the first constant is 144000 and the second constant is four.

19. The method of claim 15 comprising:
receiving a height of the access point; and
creating a prefix representing the height of the access point.

20. The method of claim 19 wherein the prefix is 2 characters.

21. The method of claim 19 wherein creating the prefix comprises:
generating a first character by adding 1200 to a height value, dividing it by 60 and converting that amount to base 60;
generating a second character by dividing the height value by 10 and converting the result to base 60; and
appending the first character and the second character together as the prefix.

22. The method of claim 15 wherein the geographic code includes visible and easily typed characters and is less than 20 characters.

23. The method of claim 15 wherein the geographic code is part of an SSID field of an access point beacon.

24. The method of claim 23 wherein the geographic code is positioned near an end of the SSID field of the access point beacon.

25. A method for decoding a geographic code to produce a location, the method comprising:
receiving a geographic code including a plurality of characters;
determining a first multiplier and a second multiplier from a first character of the geographic code;
determining a latitude of the location by retrieving four characters following the first character of the geographic code, converting the four characters from base 60 to an integer and adding the first multiplier to the integer; and
determining a longitude of the location by retrieving a last four characters of the geographic code, converting the last four characters from base 60 to an integer and adding the second multiplier to the integer,
wherein base 60 is a number system that uses 60 digits.

26. The method of claim 25 comprising:
receiving a prefix; and
decoding the prefix to determine a height of the access point.

27. The method of claim 26 wherein decoding the prefix comprises converting a second character of the prefix from base 60 to an integer value and multiplying the result by 10 then adding the value of converting a first character from base 60 to an integer value and multiplying that integer value by 600 and subtracting 1200.

28. The method of claim 25, determining whether a first character of the geographic code is within a proper character range.

29. The method of claim 25, determining whether the plurality of characters of the geographic code are within a proper character range.

* * * * *